United States Patent
Du et al.

(10) Patent No.: US 11,299,159 B2
(45) Date of Patent: *Apr. 12, 2022

(54) APPARATUS FOR AND METHOD OF CONTROLLING VEHICLE CREEP TORQUE

(71) Applicants: Hyundai Motor Company, Seoul (KR); Kia Motors Corporation, Seoul (KR)

(72) Inventors: Gwang Il Du, Incheon (KR); Hoon Han, Hwaseong-si (KR); Chun Hyuk Lee, Hwaseong-si (KR); Jee Wook Huh, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/036,663

(22) Filed: Sep. 29, 2020

(65) Prior Publication Data

US 2021/0387625 A1 Dec. 16, 2021

(30) Foreign Application Priority Data

Jun. 12, 2020 (KR) .................. 10-2020-0071260

(51) Int. Cl.
*B60W 10/06* (2006.01)
*B60W 30/18* (2012.01)
*B60W 10/18* (2012.01)

(52) U.S. Cl.
CPC ...... *B60W 30/18063* (2013.01); *B60W 10/06* (2013.01); *B60W 10/18* (2013.01);
(Continued)

(58) Field of Classification Search
CPC ....... B60W 30/18063; B60W 2520/04; B60W 2552/15; B60W 2540/12;
(Continued)

(56) References Cited

U.S. PATENT DOCUMENTS

| 6,918,854 | B2 * | 7/2005 | Okada | B60W 10/06 |
| | | | | 477/114 |
| 9,045,127 | B2 * | 6/2015 | Tashiro | B60W 10/06 |

(Continued)

FOREIGN PATENT DOCUMENTS

CN 110667587 A * 1/2020

*Primary Examiner* — Roger L Pang
(74) *Attorney, Agent, or Firm* — Morgan, Lewis & Bockius LLP

(57) ABSTRACT

A method of and an apparatus of controlling a creep torque to be exerted on a vehicle, may include facilitating a control unit to determine from a vehicle speed signal whether or not a vehicle comes to a stop, facilitating the control unit to determine from a slope angle signal a state of a road in accordance with a slope angle of the road; facilitating the control unit to determine a gear-shift step state, facilitating the control unit to decide a creep torque command on the basis of a result of the determination, the gear-shift step state, and information on the state of the road in accordance with the slope angle, and facilitating the control unit to output the decided creep torque command to perform creep torque control that generates a creep torque corresponding to the creep torque command from a motor.

14 Claims, 5 Drawing Sheets

(52) U.S. Cl.
CPC .............. *B60W 30/18118* (2013.01); *B60W 2510/1005* (2013.01); *B60W 2520/04* (2013.01); *B60W 2540/12* (2013.01); *B60W 2552/15* (2020.02); *B60W 2552/20* (2020.02); *B60W 2710/083* (2013.01)

(58) Field of Classification Search
CPC ..... B60W 2510/1005; B60W 2552/20; B60W 30/18118; B60W 2710/083; B60W 10/06; B60W 10/18
See application file for complete search history.

(56) References Cited

U.S. PATENT DOCUMENTS

2013/0197731 A1* 8/2013 Schum ................ B60L 15/2081
701/22
2020/0377096 A1* 12/2020 Park .................... B60W 40/107
2021/0086625 A1* 3/2021 Bakewell ................ B60L 15/10

* cited by examiner

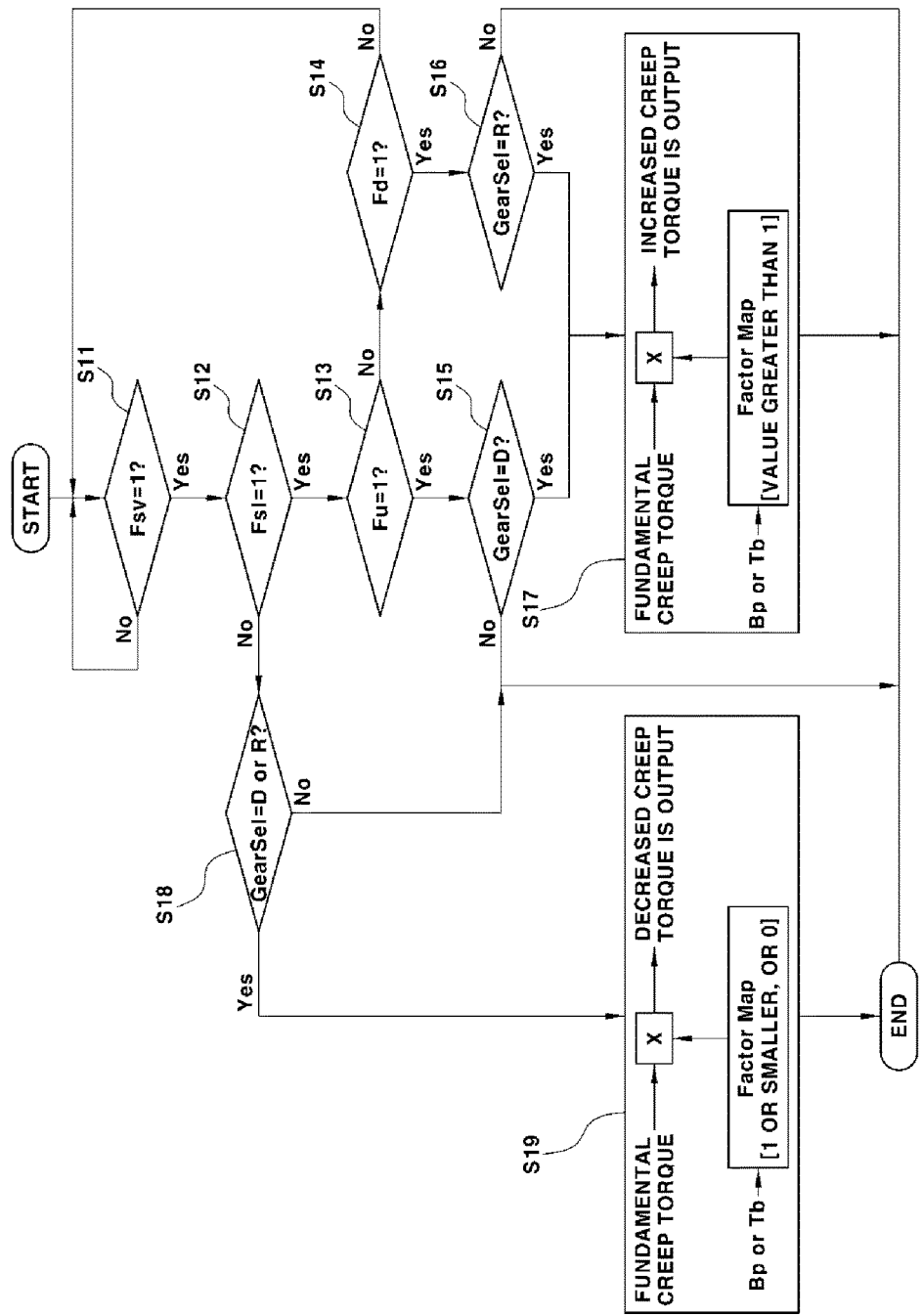

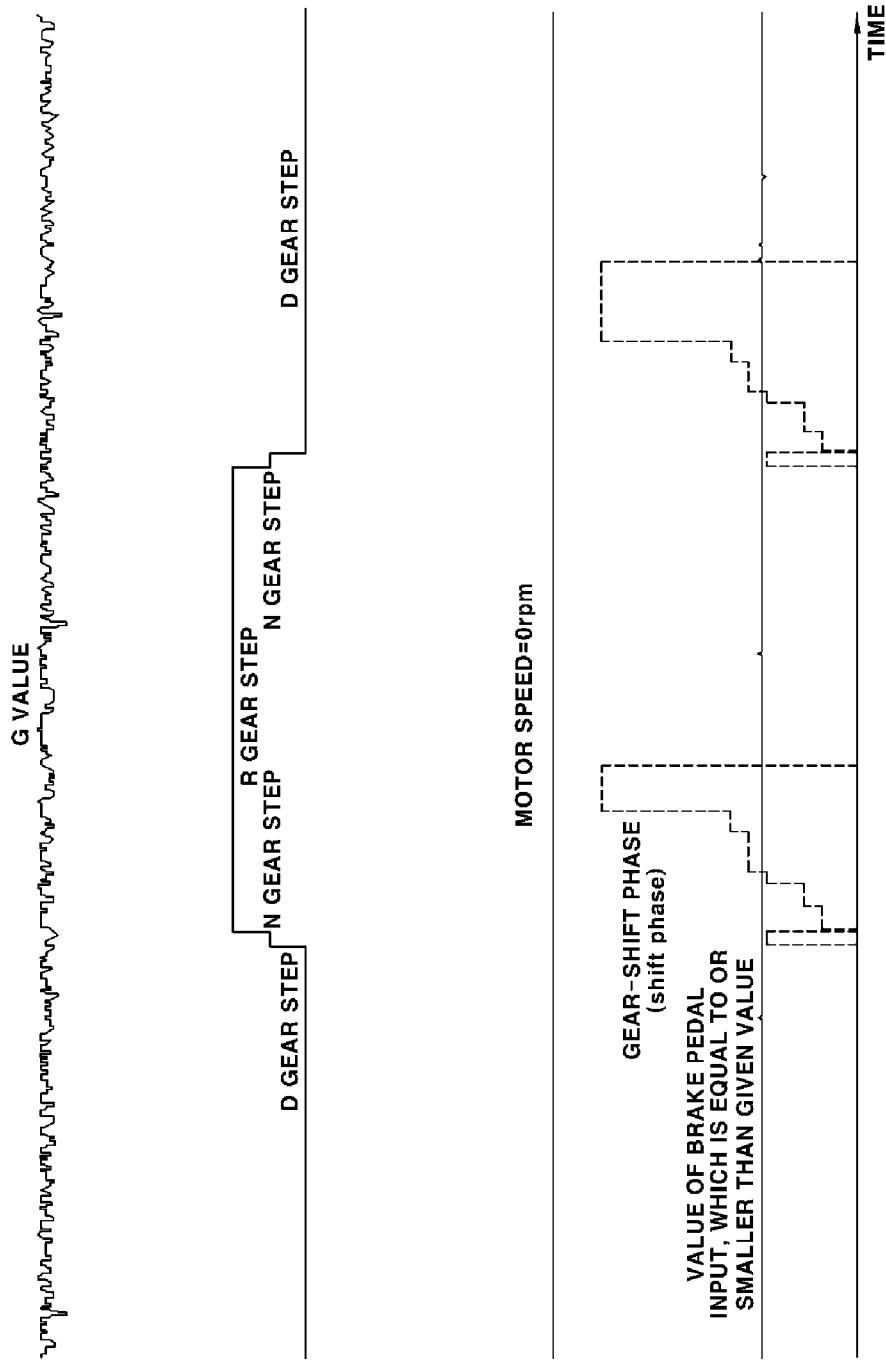

APPARATUS FOR AND METHOD OF CONTROLLING VEHICLE CREEP TORQUE

CROSS REFERENCE TO RELATED APPLICATION

The present application claims priority to Korean Patent Application No. 10-2020-0071260, filed Jun. 12, 2020, the entire contents of which is incorporated herein for all purposes by this reference.

BACKGROUND OF THE INVENTION

Field of the Invention

The present invention relates to an apparatus for and a method of controlling a creep torque of a vehicle. More particularly, the present invention relates to an apparatus of and a method of controlling a creep torque of a vehicle, the apparatus and method being configured for improving seamlessness in shifting from the R gear to the D gear or from the D gear to the R gear while a hybrid electric vehicle is coming to a stop.

Description of Related Art

A hybrid vehicle utilizes two or more distinct types of power for its propulsion. A hybrid electric vehicle combines an internal combustion engine (ICE) propulsion system that obtains motive power from combustion of fuel with an electric motor propulsion system that obtains motive power from electricity stored in a battery.

The hybrid electric vehicle can output an optimal torque by effectively harmonizing operation of the internal combustion engine and operation of the electric motor while the hybrid electric vehicle runs on two types of power.

Specifically, in a transmission-mounted electric device (TMED)-type hybrid electric vehicle in which an engine clutch is provided between an engine and an electric motor and a transmission is connected to the electric motor, an electric vehicle mode and a hybrid electric vehicle mode may be implemented by engaging and disengaging the engine clutch.

Transmissions that are generally used in hybrid electric vehicles are classified into continuously variable transmissions and stepped transmissions. A hybrid electric vehicle provided with a stepped transmission performs gear shifting at a gear ratio of 3:1 or 2:1 before coming to a stop, to increase motive power when restarting and to improve fuel efficiency when starting.

A feeling of gear shifting is deceased when a torque change occurs or when a torque is smaller than 0 or is overly strong during gear shifting.

Therefore, when a hybrid electric vehicle travels at low speeds or is in a stopped state, the hybrid electric vehicle performs creep torque control that generates a creep torque, according to a preset map, using a motor.

In a case where a driver selects the R gear step which is a reverse gear step or the D gear step which is a traveling gear step, when the driver does not operate a brake pedal at or under a predetermined vehicle speed (for example, 10 km/hr), that is, when the brake pedal is in an off state, the motor is set to output a positive direction torque for starting the vehicle. This torque is referred to as creep torque.

On the other hand, when shifting from the R gear step to the D gear step or from the D gear step to the R gear step in the stopped state (0 km/hr), the gear shifting may be achieved via an N gear step as an intermediate gear step. That is, the vehicle shifts from the R gear step to the D gear step through the N gear step (i.e., R→N→D) or from the D gear step to the R gear step through the N gear step (i.e., D→N→R).

The TMED hybrid vehicle is not provided with a torque converter. Therefore, zero torque control for the motor is necessarily performed to prevent overshooting of a motor speed at the N gear step.

Therefore, in the case where the motor outputs a torque at the R gear step or the D gear step, the zero torque control for the motor is performed while the transmission is at the N gear step. After the present calibration, the motor outputs a torque when being shifted from the N gear step to the R gear step or the D gear step.

A well-known hybrid electric vehicle, when in a stopped state at the R gear step or the D gear step, performs control that reduces the creep torque, according to a vehicle speed and a value of a brake pedal input, to prevent the motor from outputting a torque.

By the control that reduces the creep torque, at the value of the brake pedal input, which is equal to or greater than a provided value, the creep torque is reduced to 0 Nm. At the value of the brake pedal input which is smaller than the provided value, an amount of reduction in the creep torque is small. Thus, the motor outputs a torque which is smaller than a creep torque of a conventional hybrid electric vehicle but is higher than a value of 0 Nm.

FIG. 1 is a view exemplarily illustrating problems occurring in the related art. FIG. 1 illustrates an example where the gear step changes from the D gear step through the N gear step to the R gear step and then changes from the R gear step through the N gear step to the D gear step.

Furthermore, FIG. 1 illustrates a G value (a vehicle acceleration value) which is detected by an acceleration sensor while the gear step changes from the D gear step through the N gear step to the R gear step and the R gear step through the N gear step to the D gear step. Furthermore, FIG. 1 illustrates that the creep torque is output when the value of the brake pedal input is equal to or smaller than the provided value and when the vehicle is in the stopped state. FIG. 1 also illustrates a motor speed during gear shifting and a gear-shift phase.

When the gear shifting changes from the R gear step to the D gear step (RD gear shifting) and from the D gear step and the R gear step (DR gear shifting), because shifting to the N gear step takes place, the zero (0) torque control is performed. FIG. 1 illustrates that, when the gear step changes from the R gear step to the N gear step or from the D gear step to the N gear step, the zero (0) torque control that reduces the motor torque and the creep torque to 0 Nm starts to be performed.

From FIG. 1, it may be seen that returning of a torque takes place when the gear shifting changes to the R gear step or the D gear step.

However, in the related art, a feeling of a difference due to gear-releasing resulting from a torque change during gear shifting or due to deterioration in shift quality, or a feeling of a difference, such as a feeling of backlash, is produced.

From FIG. 1, it may be understood that a large change in the G value takes place during gear shifting. When the stopped state of the vehicle is defined as 0 g, a maximum amount (Delta g) of change in the G value is 0.05 g. The present level indicates the feeling of a difference which may be experienced by all drivers.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus for and a method of controlling a creep torque of a vehicle, which are configured for lessening a feeling of a driving difference which is produced when shifting from an R gear step to a D gear step or from the D gear step to the R gear step while a hybrid vehicle is coming to a stop.

According to various aspects of the present invention, there is provided a method of controlling a creep torque of a vehicle, the method being performed by a control unit and including: determining from a vehicle speed signal whether or not a vehicle comes to a stop; determining from a slope angle signal a road state associated with a slope angle of a road on which the vehicle is positioned; determining a gear-shift step state of the vehicle; deciding a creep torque command on the basis of information on whether or not the vehicle comes to a stop, the gear-shift step state, and the road state associated with the slope angle of the road; and outputting the decided creep torque command such that a motor of the vehicle outputs a creep torque in accordance with the creep torque command.

According to various aspects of the present invention, there is provided an apparatus of controlling a creep torque of a vehicle, the apparatus including: a slope angle detection unit that is configured to detect a slope angle of a road; a gear-shifting detection unit that is configured to detect a gear-shift step state of a vehicle; a control unit that determines from a vehicle speed signal whether or not the vehicle comes to a stop, determines from a slope angle signal of the slope angle detection unit a state of the road in accordance with the slope angle of the road on which the vehicle is positioned, and decides a creep torque command on the basis of information on whether or not the vehicle comes to a stop, the state of the road, and the gear-shift step state detected by the gear-shift detection unit; and a motor that outputs a creep torque according to the creep torque command which is output by the control unit.

With the method of controlling a creep torque to be exerted on a vehicle according to various exemplary embodiments of the present invention, it is possible that a feeling of a difference, which is produced as is the case with a control process in the related art, is lessened when performing DR gear shifting or when performing RD gear shifting while a vehicle is coming to a stop.

Furthermore, in a situation where light braking is provided, while the vehicle is coming to a stop, the creep torque may be reduced to be close to 0 Nm. Therefore, an unnecessary torque may be prevented from being output. Fuel efficiency may be accordingly improved.

Furthermore, the creep torque is increased when driving on an upward-slopping or downward-sloping road and thus the vehicle slipping may be effectively prevented. It is also possible that the performance in starting the vehicle is improved.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5 is a flowchart illustrating a process of controlling a creep torque according to the exemplary embodiment of the present invention; and FIG. 6 is a view exemplarily illustrating an example of a result of controlling the creep torque according to the exemplary embodiment of the present invention.

Figure 1:
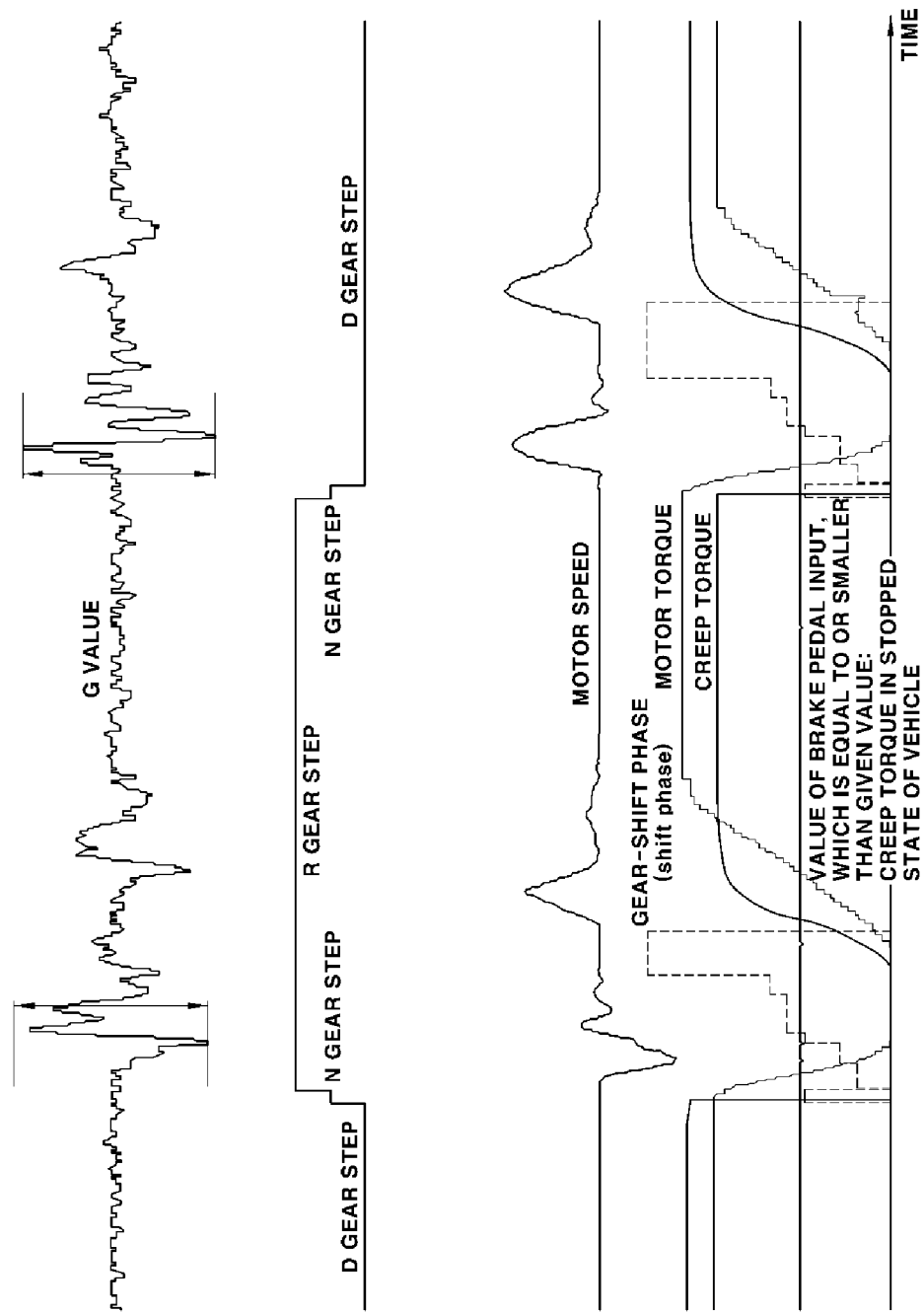
FIG. 1 is a view for describing problems with the related art.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Embodiments of the present invention will be described in detail below with reference to the accompanying drawings such that a person of ordinary skill in the art to which various exemplary embodiments of the present invention pertains is enabled to practice without undue experimentation. However, the present invention is not limited to the exemplary embodiments that will be described below and an improvement thereon and a modification thereto may be implemented.

When the expression "includes a constituent element" is used throughout the specification, unless otherwise particularly described, the present expression means "further includes any other constituent element, not "excludes any other constituent element".

According to various aspects of the present invention, there is provided a method of controlling a creep torque to be exerted on a vehicle. The method is configured for lessening a feeling of a driving difference which is produced when shifting from an R gear step to a D gear step or from the D gear step to the R step while the vehicle is coming to a stop.

The method of controlling a creep torque to be exerted on a vehicle according to various exemplary embodiments of the present invention applies to motor-driven vehicles that travel by motive power of a motor and generate a creep torque using the motor. Among the motor-driven vehicles, the method applies to a hybrid vehicle that utilizes an engine and a motor as a driving source.

Figure 2:
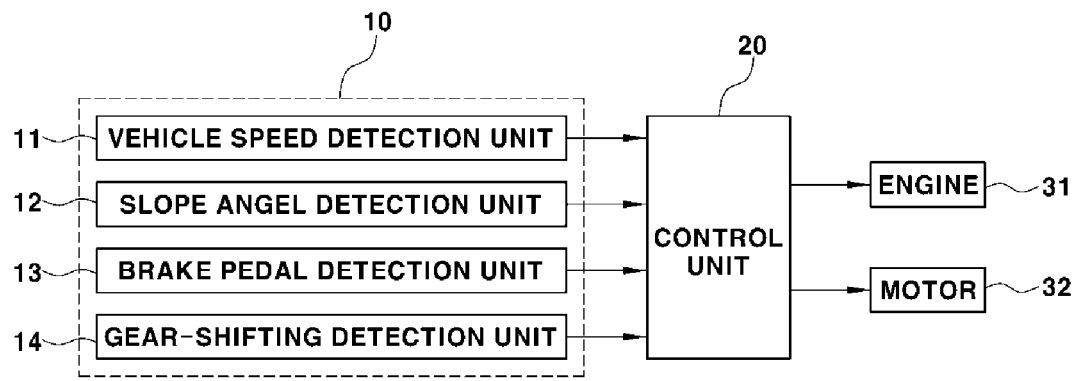
FIG. 2 is a block diagram illustrating a configuration of an apparatus that performs creep torque control according to various exemplary embodiments of the present invention.

FIG. 2 is a block diagram illustrating a configuration of an apparatus that performs creep torque control according to various exemplary embodiments of the present invention. FIG. 2 illustrates a configuration of a hybrid vehicle provided with an engine 31 and a motor 32 for driving the hybrid vehicle.

As illustrated, the creep torque control according to various exemplary embodiments of the present invention is performed by an apparatus including a driving information detection unit 10, a control unit 20, and a motor 32.

The driving information detection unit 10 here, which detects real-time driving information related to the vehicle, includes a vehicle speed detection unit 11, a slope angle detection unit 12, a brake pedal detection unit 13, and a gear-shifting detection unit 14.

The vehicle speed detection unit 11, which detects a vehicle speed in real time, includes a wheel speed sensor internally mounted within a vehicle wheel. It is well-known that vehicle speed information is obtained in real time from a signal of the wheel speed sensor.

The slope angle detection unit 12, which detects information on a slope angle of a road on which the vehicle is currently positioned, includes an acceleration sensor. It is well-known that the information on the slope angle of the road is obtained from a signal of the acceleration sensor.

The brake pedal detection unit 13 detects information on a brake pedal, which is input by the driver. The brake pedal detection unit 13 is a normal brake pedal sensor (a brake position sensor (BPS)) mounted in the brake pedal. A value of a brake pedal input (that is, a value of a pedal input) is acquired in real time from a signal of the brake pedal sensor.

The gear-shifting detection unit 14 detects information on gear shifting resulting from a driver's gear shifting operation. The information here on the gear shifting is one on a gear-shift step (gear step) selected by the driver's gear shifting operation, that is, a P, R, N, or D gear step.

The control unit 20 outputs a control signal for controlling the creep torque on the basis of vehicle driving information detected by the driving information detection unit 10. The motor 32 operates according to the control signal, output by the control unit 20, and generates and outputs the creep torque.

Figure 3:
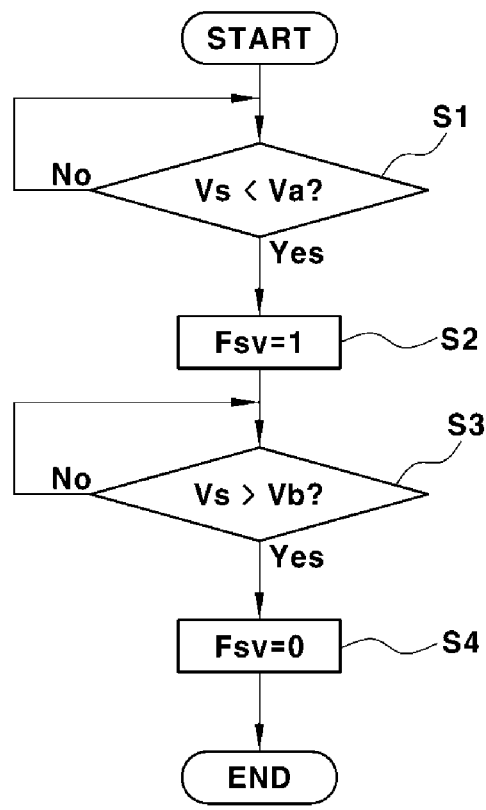
FIG. 3 is a flowchart illustrating a process of determining a stopped state of a vehicle according to various exemplary embodiments of the present invention.
Figure 4:
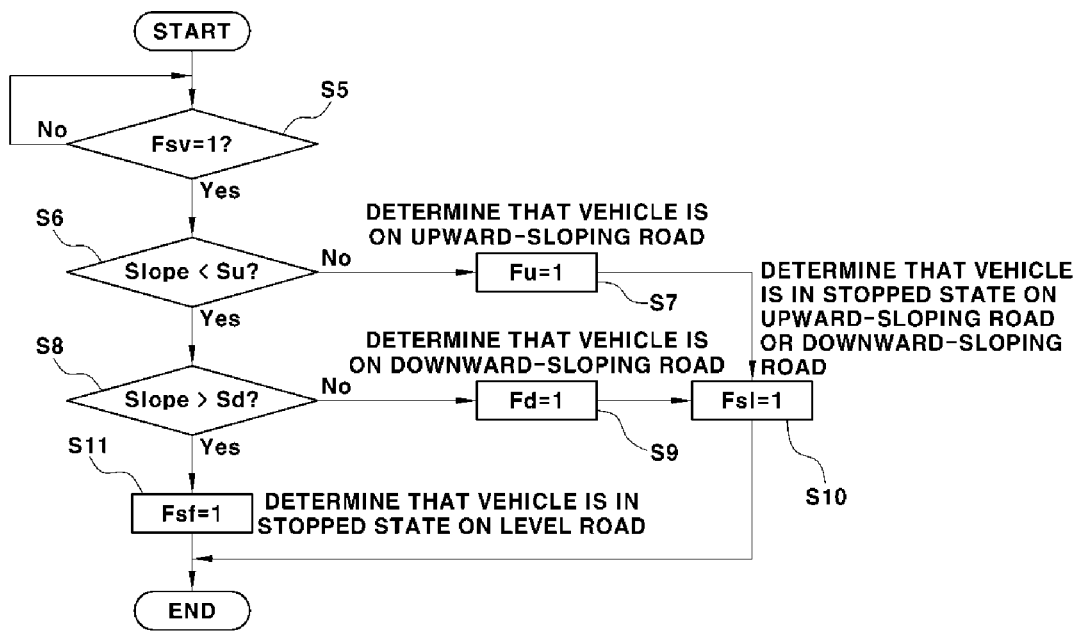
FIG. 4 is a flowchart illustrating a process of determining a state of a road according to the exemplary embodiment of the present invention.

FIG. 3 is a flowchart illustrating a process of determining a stopped state of the vehicle according to the exemplary embodiment of the present invention. FIG. 4 is a flowchart illustrating a process of determining a state of a road according to the exemplary embodiment of the present invention.

FIG. 5 is a flowchart illustrating a process of controlling the creep torque according to the exemplary embodiment of the present invention.

According to various exemplary embodiments of the present invention, with reference to vehicle speed signal, output by the vehicle speed detection unit 11, the control unit 20 determines whether or not the vehicle comes to a stop. Furthermore, with reference to a slope angle signal, output by the slope angle detection unit 12, the control unit 20 determines a state of a road on which the vehicle is currently positioned.

At the present time, the control unit 20 obtains information on the road from the slope angle signal and determines whether the vehicle is currently positioned on an upward-slopping road, a downward-sloping road, or a level road.

With reference to FIG. 2, the control unit 20 compares a current vehicle speed (Vs) detected by the vehicle speed detection unit 11 with a preset first reference speed (Va) (S1). When the current vehicle speed is lower than the first reference speed (Vs<Va), the control unit 20 determines that the vehicle currently comes to a stop. Thus, the control unit 20 sets a value of a vehicle-stopped state determination flag (Fsv), as a value of a vehicle-state determination flag, to 1 (Fsv=1) (S2).

Subsequently, the control unit 20 compares the current vehicle speed (Vs) detected by the vehicle speed detection unit 11 with a preset second reference speed (Vb) (S3). When the current vehicle speed becomes higher than the second reference speed (Vs>Vb), the control unit 20 determines that the vehicle is no longer in a stopped state. The control unit 20 sets the value of the vehicle-stopped state determination flag (Fsv), as the value of the vehicle-state determination flag, to 0 (Fsv=0) (S4).

The value of 1 of the vehicle-stopped state determination flag means that it is determined from the vehicle speed that the vehicle currently comes to a stop. The value of 0 of the vehicle-stopped state determination flag means that the vehicle is no longer in the stopped state.

In the present manner, in a case where the vehicle speed reaches 0 km/h, decreasing from a positive (+) vehicle speed, or in a case where the vehicle speed approaches 0 km/hr, decreasing to less than the first reference speed (Va), it is determined that the vehicle enters the stopped state. Subsequently, the determination that the stopped state is entered is maintained until before the vehicle speed becomes higher than the second reference speed (Vb).

Next, as illustrated in FIG. 4, after making the determination that the stopped state is entered, the control unit 20 checks from the value of the vehicle-stopped state determination flag (Fsv) whether or not the vehicle currently comes to a step (S5). When the stopped state is entered, the control unit 20 proceeds to a process of determining whether or not a current road is a level road.

At the present point, a slope angle of the road, detected by the slope angle detection unit 12, is compared with a preset first reference slope angle (Su) and second reference slope angle (Sd) (S6 and S8). When the slope angle of the road is smaller than the first reference slope angle (slope angle<Su) and greater than the second reference (slope angle>Sd), it is determined that the current road is a level road, and a value of a stopped-on-flat-ground state determination flag (Fsf), as the value of the vehicle-state determination flag, is set to 1 (Fsf=1) (S11).

In contrast, when the slope angle of the road, detected by the slope angle detection unit 12, is equal to or greater than the first reference slope angle (Su), it is determined that the current road is an upward-sloping road, and a value of an upward-sloping state determination flag (Fu), as a value of an upward-sloping state determination flag (Fd), is set to 1 (Fu=1) (S7).

Furthermore, when the slope angle of the road, detected by the slope angle detection unit 12, is equal to or smaller than the second reference slope angle (slope angle≤Sd), it is determined that the current road is a downward-sloping road, and a value of an upward-sloping state determination flag, as the value of the upward-sloping state determination flag (Fd), is set to 1 (Fd=1) (S9).

When the value of the vehicle-stopped state determination flag (Fsv) is 1 and at the same time, the value of the upward-sloping state determination flag (Fu) is 1 or the value of the upward-sloping state determination flag (Fd) is 1, the control unit 20 sets a value of a stopped-on-upward-or-downward-sloping state determination flag (FsI), as a final vehicle-state determination flag value, to 1 (Fsl=1) (S10).

Next, with reference to FIG. 5, the control unit 20 checks whether or not the vehicle is currently in the stopped state (S11). When the vehicle is currently in the stopped state, that is, when the value of the vehicle-stopped state determination flag (Fsv) is 1 (Fsv=1), the control unit 20 determines whether or not the vehicle is currently in the stopped state on an upward-sloping road or downward-sloping road (S12).

That is, when the value of the vehicle-stopped state determination flag (Fsv) is 1 (Fsv=1) and the value of the stopped-on-upward-or-downward-sloping state determination flag (FsI) is 1 (Fsl=1), it is determined that the vehicle is currently on an upward-sloping road or a downward-sloping road. Therefore, it is determined whether or not the road on which the vehicle is currently positioned is an upward-sloping road or a downward-sloping road (S13 and S14).

When the road on which the vehicle is currently positioned is an upward-sloping road, that is, when the value of the upward-sloping state determination flag (Fu) is 1 (Fu=1) in Step S13, the control unit 20 checks whether or not the gear step (GearSel) is currently the D gear step (S15). When the gear step (GearSel) is the D gear step (GearSel=d), control that increases the creep torque to be higher than a fundamental creep torque is performed (S17).

Conversely, when the road on which the vehicle is currently positioned is a downward-sloping road, that is, when the value of the upward-sloping state determination flag (Fd) is 1 (Fd=1) in Step S14, the control unit 20 checks whether or not the gear step (GearSel) is currently the R gear step (S16). When the gear step (GearSel) is the R gear step (GearSel=R), likewise, the control that increases the creep torque to be higher than a fundamental creep torque is performed (S17).

When performing the control that increases the creep torque, a first correction coefficient (factor) having a value of greater than 1 is applied to a fundamental creep torque command (an existing creep torque command) which is decided according to a well-known method. Thus, a creep torque command is corrected. Accordingly, operation of the motor 32 is controlled according to the corrected creep torque command.

Accordingly, the motor 32 outputs the corrected creep torque. When performing the control that increases the creep torque, the first correction coefficient is decided as having a value corresponding to a value of a brake pedal input (Bp) or a value of a target amount (Tb) of braking force, which is detected by the brake pedal detection unit 13.

At the present time, the first correction coefficient is decided from setting data which is in advance input and stored in the control unit 20. The setting data is data that results from defining a correlation between the value of the brake pedal input (Bp) or the value of the target amount (Tb) of braking force and the first correction coefficient.

For example, the setting data is a map in which the first correction coefficient is set to have a value corresponding to the value of the brake pedal input (Bp) or the value of the target amount (Tb) of braking force.

A map with a two-dimensional table structure, of which an input is the value of the brake pedal input (Bp) or the value of the target amount (Tb) of braking force, and of which an output is the first correction coefficient is used as the setting data. A value of the first correction coefficient is a value which is set or tuned according to the value of the brake pedal input or the value of the target amount of braking force using pieces of data that are obtained as a result of performing prior testing or evaluation of a type of corresponding vehicle in a vehicle development phase.

According to various exemplary embodiments of the present invention, the fundamental creep torque is an existing creep torque which is determined according to a well-known method. The method of determining the fundamental creep torque is well-known, and thus a detailed description thereof is omitted from the exemplary embodiment of the present invention.

In a case where the vehicle is at the D gear step on an upward-sloping road, or in a case where the vehicle is at the R gear step on a downward-sloping road, when a fixed creep torque is not output, a vehicle slipping phenomenon occurs due to insufficient brake force resulting from light braking.

Therefore, in a case where it is determined from the slope angle signal that the road is a level road, as will be described below, the creep torque is decreased. However, in a state where the vehicle is at the D gear step on an upward-sloping road or the R gear step on a downward-sloping road in the stopped state, the creep torque is increased to prevent the vehicle slipping phenomenon and to improve performance in starting the vehicle.

On the other hand, in a case where the vehicle is in the stopped state and where the vehicle is currently positioned neither on an upward-sloping road nor on a downward-sloping road, that is, in a case where the value of the vehicle-stopped state determination flag (Fsv) is 1 and where the value of the stopped-on-upward-or-downward-sloping state determination flag (FsI) is not 1, the control unit 20 determines whether or not the gear step (GearSel) is currently the D gear step or the R gear step (S18).

At the present point, in a case where the vehicle is at the D gear step or the R gear step (GearSel=D or R), the vehicle is currently in the stopped state and is positioned on a level road. Therefore, the control unit 20 performs control that decreases the creep torque to be lower than the fundamental creep torque (S19).

In the present manner, according to various exemplary embodiments of the present invention, the control that decreases the creep torque is performed only when the vehicle is positioned on a level road.

When performing the control that decreases the creep torque, a second correction coefficient having a value of 1 or smaller is applied to the fundamental creep torque command which is decided according to a well-known method and thus, the creep torque command is corrected. Accordingly, the operation of the motor 32 is controlled according to the corrected creep torque command.

Accordingly, the motor 32 outputs the corrected creep torque. When performing the control that decreases the creep torque, the second correction coefficient is also decided as having a value corresponding to the value of the brake pedal input (Bp) or the value of the target amount (Tb) of braking force, which is detected by the brake pedal detection unit 13.

At the present time, the second correction coefficient is decided from setting data which is in advance input and stored in the control unit 20. The setting data is data that results from defining a correlation between the value of the brake pedal input (Bp) or the value of the target amount (Tb) of braking force and the second correction coefficient.

For example, the setting data is a map in which the second correction coefficient is set to have a value corresponding to the value of the brake pedal input (Bp) or the value of the target amount (Tb) of braking force.

That is, a map with a two-dimensional table structure, of which an input is the value of the brake pedal input (Bp) or the value of the target amount (Tb) of braking force, and of which an output is the second correction coefficient is used as the setting data. A value of the second correction coefficient is a value which is set or tuned according to the value of the brake pedal input or the value of the target amount of braking force using pieces of data that are obtained as a result of performing prior testing or evaluation of the type of corresponding vehicle in the vehicle development phase.

The following Table 1 is an example for deciding the second correction coefficient from the value of the brake pedal input (Bp) when performing the control that decreases the creep torque.

TABLE 1

| | Value of a Brake Pedal Input (Value of an Input) | | | |
|---|---|---|---|---|
| | 0% | 5% | 10% | 15% |
| Correction Coefficient (Value of an Output) | 1 | 0.5 | 0.1 | 0 |

According to various exemplary embodiments of the present invention, when performing the control that decreases the creep torque, the creep torque command is generated by multiplying the fundamental creep torque by the second correction coefficient having a value of 1 or smaller. With reference to Table 1, in a case where the value of the brake pedal input is equal to or greater than 15%, the second correction coefficient is 0. Therefore, the creep torque command is 0. Thus, the creep torque is not generated.

Furthermore, in a case where a driver does not depress the brake pedal, that is, in a case where the value of the brake pedal input is 0%, the second correction coefficient is 1. In the instant case, instead of decreasing the creep torque, a value of the fundamental creep torque, as is, becomes the creep torque command. The motor 32 generates the creep torque having the value of the fundamental creep torque.

Numerical values in Table 1 are exemplary and do not impose any limitation on the present invention. It is possible that each numerical value is suitably changed or tuned on the basis of the prior testing or evaluation.

The closer the creep torque is to 0 Nm, the smaller the change in the torque is when shifting from the R gear step to the D gear step and from the D gear step to R gear step. Thus, the feeling of a difference may be lessened. Furthermore, it is possible that the control coefficient is set to 0 over all sections in a normal state on a level road regardless of the value of the brake pedal input or the value of the target amount of braking force and that the creep torque is thus controlled to 0 Nm.

Furthermore, although not illustrated in FIG. 4, through the creep torque control according to various exemplary embodiments of the present invention, in a state where the vehicle is in the stopped state on a level road, on an upward-sloping road, or on a downward-sloping road, in a case where the gear step is the N gear step, zero (0) torque control starts as is the case with the existing method.

FIG. 6 is a view exemplarily illustrating an example of a result of controlling the creep torque according to the exemplary embodiment of the present invention from FIG. 5, it may be seen that the change in the G value seldom occurs when shifting from the D gear step through the N gear step to the R gear step (DR gear shifting) or when shifting from the R gear step through the N gear step to the D gear step (RD gear shifting) while the vehicle is coming to a stop.

In the present manner, with the method of controlling the creep torque according to various exemplary embodiments of the present invention, it is possible that the feeling of a difference, which is produced as is the case with a control process, is lessened when performing the DR gear shifting or when performing the RD gear shifting while the vehicle is coming to a stop.

Furthermore, in a situation where light braking is provided, while the vehicle is coming to a stop, the creep torque may be reduced to be close to 0 Nm. Therefore, an unnecessary torque may be prevented from being output. Fuel efficiency may be accordingly improved.

Furthermore, the creep torque is increased when driving on an upward-sloping or downward-sloping road and thus the vehicle slipping may be effectively prevented. It is also possible that the performance in starting the vehicle is improved.

Furthermore, the term "controller" or "control unit" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller or the control unit may be at least one microprocessor operated by a predetermined program which may include a series of commands for carrying out a method in accordance with various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof.

What is claimed is:

1. A method of controlling a creep torque of a vehicle, the method being performed by a controller, the method comprising:
    determining from a vehicle speed signal whether the vehicle comes to a stop;
    determining from a slope angle signal a road state associated with a slope angle of a road on which the vehicle is positioned;
    determining a gear-shift step state of the vehicle;
    deciding a creep torque command on a basis of information on whether the vehicle comes to the stop, the gear-shift step state, and the road state associated with the slope angle of the road; and
    outputting the decided creep torque command for performing creep torque control so that a motor of the vehicle generates the creep torque in accordance with the creep torque command,
    wherein, in the deciding of the creep torque command, when the vehicle is in a stopped state, the road on which the vehicle is positioned is an upward-sloping road, and a gear-shift step is a traveling gear step, the controller is configured to decide the creep torque command as a value higher than a value of a fundamental creep torque, which is determined according to a current driving state of the vehicle, and
    wherein in the deciding of the creep torque command, the controller is configured to decide as the creep torque command a value resulting from applying a first correction coefficient having a value of greater than 1 to the value of the fundamental creep torque.

2. The method according to claim 1, wherein in the determining of the road state, the controller is configured to determine one among an upward-sloping road, a downward-sloping road, and a level road, as the information on the road state associated with the slope angle of the road.

3. The method according to claim 1, wherein in the determining of the gear-shift step state, the controller is configured to determine one among a traveling gear step and a reverse gear step as the gear-shift step state.

4. The method according to claim 1, wherein the first correction coefficient is decided as a value of a brake pedal input or a value corresponding to a predetermined target amount of braking force, which a driver provides using setting data stored in the controller.

5. The method of claim 1, wherein the controller includes:
    a processor; and
    a non-transitory storage medium on which a program for performing the method of claim 1 is recorded and executed by the processor.

6. A method of controlling a creep torque of a vehicle, the method being performed by a controller, the method comprising:
    determining from a vehicle speed signal whether the vehicle comes to a stop;
    determining from a slope angle signal a road state associated with a slope angle of a road on which the vehicle is positioned;
    determining a gear-shift step state of the vehicle;
    deciding a creep torque command on a basis of information on whether the vehicle comes to the stop, the gear-shift step state, and the road state associated with the slope angle of the road; and
    outputting the decided creep torque command for performing creep torque control so that a motor of the vehicle generates the creep torque in accordance with the creep torque command,
    wherein, in the deciding of the creep torque command, when the vehicle is in a stopped state, the road on which the vehicle is positioned is a downward-sloping road, and a gear-shift step is a reverse gear step, the controller is configured to decide the creep torque command as a value higher than a value of a fundamental creep torque, which is determined according to a current driving state of the vehicle, and
    wherein in the deciding of the creep torque command, the controller is configured to decide as the creep torque command a value resulting from applying a first correction coefficient having a value of greater than 1 to the value of the fundamental creep torque.

7. The method according to claim 6, wherein the first correction coefficient is decided as a value of a brake pedal input or a value corresponding to a predetermined target amount of braking force, which a driver provides using setting data stored in the controller.

8. A method of controlling a creep torque of a vehicle, the method being performed by a controller, the method comprising:
    determining from a vehicle speed signal whether the vehicle comes to a stop;
    determining from a slope angle signal a road state associated with a slope angle of a road on which the vehicle is positioned;
    determining a gear-shift step state of the vehicle;
    deciding a creep torque command on a basis of information on whether the vehicle comes to the stop, the gear-shift step state, and the road state associated with the slope angle of the road; and
    outputting the decided creep torque command for performing creep torque control so that a motor of the vehicle generates the creep torque in accordance with the creep torque command,
    wherein, in the deciding of the creep torque command, when the vehicle is in a stopped state, the road on which the vehicle is positioned is a level road, and a gear-shift step is a traveling gear step, the controller is configured to decide the creep torque command as a value lower than a value of a fundamental creep torque, which is determined according to a current driving state of the vehicle, and
    wherein in the deciding of the creep torque command, the controller is configured to decide as the creep torque command a value resulting from applying a second correction coefficient having a value of 1 or smaller to the value of the fundamental creep.

9. The method according to claim 8, wherein the second correction coefficient is decided as a value of a brake pedal input or a value corresponding to a predetermined target amount of braking force, which a driver provides using setting data stored in the controller.

10. An apparatus for controlling a creep torque of a vehicle, the apparatus including:
- a speed detection unit that is configured to detect a vehicle speed;
- a slope angle detection unit that is configured to detect a slope angle of a road;
- a gear-shifting detection unit that is configured to detect a gear-shift step state of the vehicle;
- a controller that is configured to determine from a vehicle speed signal whether the vehicle comes to a stop, to determine from a slope angle signal of the slope angle detection unit a state of the road in accordance with the slope angle of the road on which the vehicle is positioned, and to decide a creep torque command on a basis of a result of determining whether the vehicle comes to the stop, the state of the road, and information on the gear-shift step state detected by the gear-shift detection unit; and
- a motor that outputs the creep torque according to the creep torque command which is output by the controller,
- wherein, when the vehicle is in a stopped state, the road on which the vehicle is positioned is an upward-sloping road, and a gear-shift step is a traveling gear step, the controller is configured to decide the creep torque command as a value higher than a value of a fundamental creep torque, which is determined according to a current driving state of the vehicle,
- wherein the controller is configured to decide as the creep torque command a value resulting from applying a first correction coefficient having a value of greater than 1 to the value of the fundamental creep torque, and
- wherein the first correction coefficient is decided as a value of a brake pedal input or a value corresponding to a predetermined target amount of braking force, which a driver provides using setting data stored in the controller.

11. The apparatus according to claim 10, wherein, when the vehicle is in the stopped state, the road on which the vehicle is positioned is a downward-sloping road, and the gear-shift step is a reverse gear step, the controller is configured to decide the creep torque command as a value higher than the value of the fundamental creep torque, which is determined according to the current driving state of the vehicle.

12. The apparatus according to claim 11, wherein the controller is configured to decide as the creep torque command a value resulting from applying the first correction coefficient having a value of greater than 1 to the value of the fundamental creep torque, and
- wherein the first correction coefficient is decided as a value of a brake pedal input or a value corresponding to a predetermined target amount of braking force, which a driver provides using setting data stored in the controller.

13. The apparatus according to claim 10, wherein, when the vehicle is in the stopped state, the road on which the vehicle is positioned is a level road, and the gear-shift step is a traveling gear step, the controller is configured to decide the creep torque command as a value lower than the value of the fundamental creep torque, which is determined according to the current driving state of the vehicle.

14. The apparatus according to claim 13,
- wherein the controller is configured to decide as the creep torque command a value resulting from applying a second correction coefficient having a value of 1 or smaller to the value of the fundamental creep torque, and
- wherein the second correction coefficient is decided as a value of a brake pedal input or a value corresponding to a predetermined target amount of braking force, which a driver provides using setting data stored in the controller.

* * * * *